United States Patent Office 3,740,393
Patented June 19, 1973

3,740,393
STYRYL COMPOUNDS
Klaus-Dieter Bode and Josef Schroeder, Leverkusen, and Carl-Wolfgang Schellhammer, Opladen, Germany, assignors to Farbenfabriken Bayer Aktiengesellschaft, Leverkusen, Germany
No Drawing. Filed Oct. 22, 1970, Ser. No. 83,243
Claims priority, application Germany, Nov. 3, 1969,
P 19 55 065.3
Int. Cl. C09b 23/14
U.S. Cl. 260—240 D         7 Claims

ABSTRACT OF THE DISCLOSURE

2 - [4' - (oxdiazolyl - 2'')-styryl]-benzotriazoles of the general formula

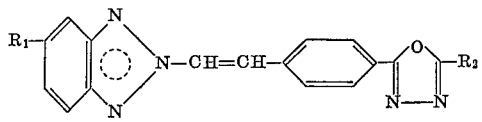

in which $R_1$ denotes hydrogen, halogen, alkyl, aralkyl or aryl radicals, and $R_2$ means hydrogen, aryl, aralkenyl or heteroaryl radicals, as well as their preparation and their use as optical brightening agents.

The subject-matter of the present invention comprises oxdiazolylstyryl-benzotriazoles of the general formula

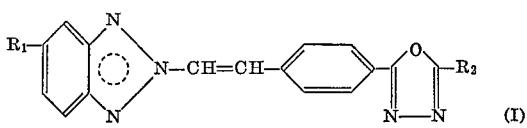

(I)

in which $R_1$ denotes hydrogen, halogen, alkyl, aralkyl or aryl radicals, and $R_2$ means hydrogen, aryl, aralkenyl or heteroaryl radicals.

Suitable radicals $R_1$ are preferably hydrogen, chlorine, alkyl radicals with 1–4 carbon atoms, the benzyl radical, and phenyl radicals which may be substituted by chlorine, cyano, alkyl radicals with 1–6 carbon atoms, cycloalkyl radicals with 5–6 carbon atoms or alkoxy radicals with 1–4 carbon atoms.

Suitable radicals $R_2$ are hydrogen, phenyl radicals which may be substituted by chlorine, phenyl radicals, alkyl radicals with 1–6 carbon atoms or alkoxy radicals with 1–4 carbon atoms, the β-styryl radical, and radicals of nitrogen-containing heterocycles, preferably the benzoxazol-2-yl radical which may be substituted in the benzene nucleus by lower alkyl radicals.

Examples of compounds of the general Formula I which are especially preferred are those listed in the following table:

TABLE 1

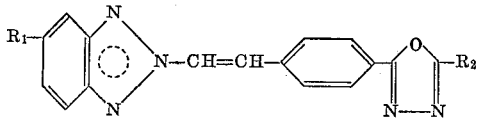

| $R_1$ | $R_2$ |
|---|---|
| H | $C_6H_5$— |
| H | p-$CH_3$—$C_6H_4$— |
| H | p-Cl—$C_6H_4$ |
| H | p-$CH_3O$—$C_6H_4$— |
| H | p-t-$C_4H_9$—$C_6H_4$— |
| H | p-$C_6H_5$—$C_6H_4$— |
| H | p-⟨H⟩—$C_6H_4$— |

TABLE—Continued

| $R_1$ | $R_2$ |
|---|---|
| H | CH₃-[benzoxazolyl] |
| H | $C_6H_5$—CH=CH— |
| $CH_3$ | $C_6H_5$— |
| $CH_3$ | p-$CH_3$—$C_6H_4$— |
| $CH_3$ | p-Cl—$C_6H_4$— |
| $CH_3$ | p-$CH_3O$—$C_6H_4$— |
| $CH_3$ | p-t-$C_4H_9$—$C_6H_4$— |
| $CH_3$ | p-$C_6H_5$—$C_6H_4$— |
| $CH_3$ | p-⟨H⟩—$C_6H_4$— |
| $CH_3$ | CH₃-[benzoxazolyl] |
| $C_6H_5$ | $C_6H_5$— |
| $C_6H_5$ | p-$CH_3$—$C_6H_4$— |
| $C_6H_5$ | p-Cl—$C_6H_4$— |
| $C_6H_5$ | p-$CH_3O$—$C_6H_4$— |
| $C_6H_5$ | p-t-$C_4H_9$—$C_6H_4$— |
| $C_6H_5$ | p-$C_6H_5$—$C_6H_4$— |
| $C_6H_5$ | p-⟨H⟩—$C_6H_4$— |
| $C_6H_5$ | CH₃-[benzoxazolyl] |

NOTE.—$C_4H_9$=Butyl; $C_6H_5$=Phenyl; $C_6H_4$=Phenylene. The circular symbol represents the various mesomeric forms of the benzotriazole radical.

The oxdiazolyl-styryl-benzotriazoles (I) can be prepared according to various processes.

The new compounds are obtained in a particularly advantageous way by cyclising diazyl hydrazides of the general Formula II

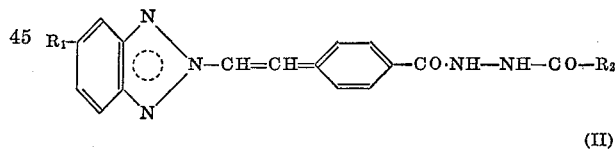

(II)

in which $R_1$ and $R_2$ have the same meaning as above; in inert solvents in the presence of dehydrating agents.

The diazyl hydrazides to be used according to the invention are obtained by either Reacting β-(2'-benzotriazolyl)-styryl-4-carboxylic acid halides of the general formula

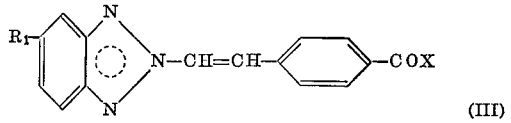

(III)

in which $R_1$ has the same meaning as above, and X stands for halogen,

With carboxylic acid hydrazides of the general formula $$R_2—CONHNH_2 \quad (IV)$$

in which $R_2$ has the same meaning as above,

Or reacting β-(2'-benzotriazolyl)-styryl-4-carboxylic acid hydrazides of the general formula

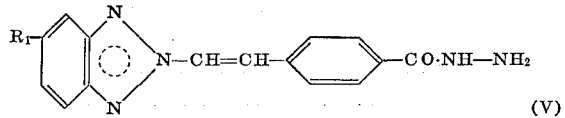

in which $R_1$ has the same meaning as above,

With carboxylic acid halides of the general formula $$R_2-COX \qquad (VI)$$

in which $R_2$ has the same meaning as above, and X stands for halogen,

In the presence of acid acceptors in an inert solvent.

The benzotriazolyl-styryl-carboxylic acid halides (III) or hydrazides (V) used as starting materials can be prepared in known manner by reacting suitable benzotriazoles with sodium chloroacetate, separating the corresponding benzotriazolyl 2-acetic acids from the resultant isomer mixture by means of concentrated hydrochloric acid as described in A 515, 113 (1935), condensing these compounds with 4-acarboxybenzaldehyde to form β-(2'-benzotriazolyl)-styrene-4-carboxylic acids (VIII), and converting the latter into the corresponding carboxylic acid halides (III) or esters (IX), which, in turn can be converted into the acid hydrazides (V) by treatment with anhydrous hydrazine:

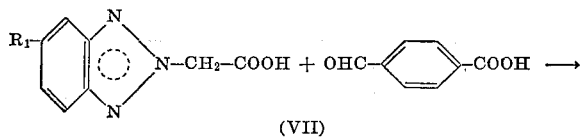

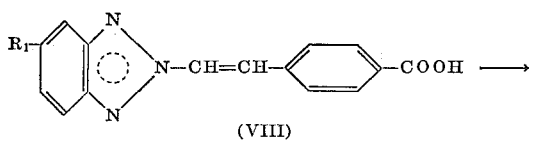

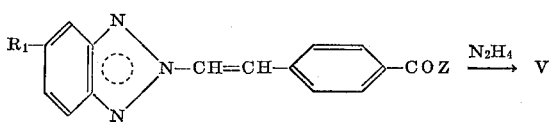

Z = halogen (III)  (IX)
Z = alkoxy (IX)

Some of the carboxylic acid hydrazides (IV) to be used according to the above process for the preparation of the diacyl hydrazides (II) are known; they can easily be prepared in known manner by the reaction of the corresponding acid chlorides or esters with hydrazine.

Suitable hydrazides (IV) are, for example: benzhydrazide, p-tolyl-benzohydrazide, o-tolyl-benzhydrazide, m-tolyl-benzhydrazide, p-tert.-butyl-benzhydrazide, p-chlorobenzhydrazide, m-chlorobenzhydrazide, p-bromobenzhydrazide, p-methoxy-benzhydrazide, p-ethoxy-benzhydrazide, p-phenyl-benzhydrazide, p-cyclohexyl-benzhydrazide, cinnamic acid hydrazide, p-chloro cinnamic acid hydrazide, picolic acid hydrazide, nicotinic acid hydrazide, isonicotinic acid hydrazide, naphthoic acid hydrazide, 5-methylbenzoxazolyl-2-carboxylic acid hydrazide, thiophen-2-carboxylic acid-hydrazide, 5-phenylthiophen-2-carboxylic acid hydrazide, stilbene-carboxylic acid hydrazide.

Suitable carboxylic acid halides (VI) which are required in the last-mentioned process as reaction partners for the benzotriazolyl-carboxylic acid hydrazides (V) are, for example, the following compounds: benzoyl chloride, p-tolyl acid chloride, p-anisyl chloride, p-tert.-butyl-chloride, p-chlorobenzoyl chloride, p-bromobenzoyl chloride, cinnamic acid chloride, p-phenyl-benzoyl chloride, p-cyclohexyl-benzoyl chloride, stilbene-carboxylic acid chloride.

Suitable acid acceptors are, for example, triethylamine, pyridine, picoline, collidine, sodium carbonate and potassium carbonate.

Suitable inert solvents are, for example: dioxan, toluene, xylene, chlorobenzene, o-dichlorobenzene, nitrobenzene, tetrachloroethane, nitromethane, ethylacetate, dimethyl formamide, dimethyl sulphoxyde or pyridine.

Suitable dehydrating agents are, for example, thionyl chloride, dicyclohexyl carbodiimide, phosphorus pentoxide, polyphosphoric acid, p-toluene-sulphonic acid, p-toluene-sulphonyl chloride; thionyl chloride is regarded as particularly suitable.

An expedient procedure for preparing the diacyl hydrazides (II) to be used according to the invention consists in either reacting 1 mol of an acid chloride, dissolved in an inert anhydrous solvent, in the presence of 1.05 to 1.50 mol of an acid acceptor with 1.00 to 1.25 mol of a hydrazide (IV) at temperatures between 20° and 100° C. for 0.5 to 5 hours, preferably 1 to 2 hours; or in reacting 1 mol of a benzotriazolyl-styryl-carboxylic acid chloride (III) or its ester (IX), dissolved in an inert solvent, in the presence of 1.05 to 1.50 mol of an acid acceptor with 0.9 to 1.0 mol of anhydrous hydrazine at 0° to 20° C. for 1 to 3 hours and subsequently stirring the mixture, possibly in the presence of 1.05 to 1.25 mol of an acid halide (VI), preferably a chloride, at 20° to 100° C. for 0.5 to 5 hours, preferably 1 to 2 hours.

Cyclisation to form the new compounds (I) is advantageously carried out by mixing 1 mol of a diacyl hydrazide (II) in an inert solvent with 1.05 to 1.25 mol of a dehydrating agent, stirring for 0.15 to 12 hours, preferably 0.3 to 4 hours, at 75° to 200° C., preferably at 130° to 175° C., and, finally, working up in the usual way after cooling.

The new compounds (I) are valuable optical brightening agents which can be used for brightening a variety of high-molecular or low-molecular organic materials. The following materials may be mentioned by way of example: synthetic organic high-molecular materials, for example, polymerisation products based on organic compounds which contain at least one polymerisable carbon-carbon double bond and on the conversion products such as cross-linking, graft or decomposition products; diluted polymers etc. such as polymers derived from α,β-unsaturated carboxylic acids and their derivatives or on olefinic hydrocarbons; polymers derived from vinyl and vinylidene compounds or from halogenated hydrocarbons; polymers obtainable by ring opening such as polyamides of the polycaprolactam type; furthermore, formaldehyde polymers or polymers which can be obtained by polyaddition as well as polycondensation, such as polyethers, polythioethers, polyacetals, thioplasts; polycondensation products or precondensates based on bi- or polyfunctional compounds with condensable groups, their homo- and co-condensation products, such as e.g. saturated compounds (e.g. polyethylene terephthalates) or unsaturated compounds (e.g. maleic acid dialcohol polycondensates and their cross-linking products with copolymerisable vinyl monomers); polyesters, polyamides (e.g. hexamethylene-diamine adipate), maleinate resins, melamine resins, phenol resins (novolakes), aniline resins, furan resins, carbamic resins and also their precondensates and products of analogous structure, polycarbonates, silicone resins and others; polyaddition products such as polyurethanes, epoxide resins; furthermore, semi-synthetic organic materials such as cellulose esters and mixed esters (acetate, propionate); nitrocellulose, cellulose ether, regenerated cellulose or the after-treatment products thereof; casein synthetics; furthermore, natural organic materials of animal or vegetable origin based, for example, on cellulose or proteins such as wool, cotton or silk.

The organic materials concerned may be present in various stages of processing and states of aggregate, for example, as blocks, plates, chips, granules, films, foils, lacquers, ribbons, coverings, impregnations and coatings, or as threads, fibres or flakes. On the other hand, the said materials may also be present in various homogeneous or inhomogeneous forms of distribution and stages of aggregate, e.g. as powders, solutions, emulsions, dispersions.

Fibre materials may be present, for example, as endless filaments, loose material, strand material, textile fibres, yarns, fibre fleeces or as textile fabrics or textile bonded fabrics, knitted fabrics, or as papers and cardboards or paper pulp etc.

Brightening of the textile materials is preferably carried out in an aqueous medium from a solution or dispersion. Dispersing agents may be added, such as soaps, polyglycol ethers of fatty alcohols, fatty amines or alkylphenols, cellulose sulphite waste liquor or condensation products of optionally alkylated naphthalene-sulphonic acids with formaldehyde. The brightening can be carried out from a neutral, weakly alkaline or acidic bath, optionally at elevated temperatures. The brightening agents may also be applied from solutions in organic solvents.

The new optical brightening agents may also be added to or incorporated with the materials before or during moulding. For example, they can be added to the moulding powder or the injection moulding mass in the production of films, foils, ribbons or moulded articles, or they may be dissolved or dispersed in the spinning solution before spinning. The optical brightening agents may also be added to the starting materials, reaction mixtures or intermediate products for the production of fully or semi-synthetic organic materials, that is to say also before or during the chemical reaction, for example, in the case of a polycondensation, polymerisation or polyaddition.

The new brightening agents are characterised by their particularly good fastness to chlorite.

The amount of the new optical brightening agents to be used according to the invention, referred to the material to be optically brightened, may vary within wide limits. In general, amounts between 0.01 and 0.2 percent by weight are used.

The new brightening agents may also be used in the following way, for example:

(a) in mixtures with dyestuffs or pigments or as additives to dyebaths, printing, discharge or reserve pastes, and also for the after-treatment of dyeings, prints or discharge prints;

(b) in mixtures with so-called "carriers," antioxidants, agents protecting against light, thermal stabilisers, chemical bleaching agents, or as additive to bleaching baths (c) in mixtures with cross-linking agents, finishing agents such as starch, or finishing agents obtainable by synthetic methods; the products of the invention can also be added with advantage to baths used for attaining a crease-proof finish;

(d) in combination with washing agents; the washing agents and the brightening agents may be separately added to the wash baths to be used. It is also advantageous to use washing agents to which the brightening agents have been admixed. Suitable washing agents are, for example, soaps, salts of sulphonate detergents, such as e.g. of sulphonated benzimidazoles substituted on the 2-carbon atom by higher alkyl radicals; furthermore, salts of monocarboxylic acid esters of 4-sulphophalic acid with higher fatty alcohols; further salts of fatty alcohol sulphonates, alkylaryl-sulphonic acids or condensation products of higher fatty acids with aliphatic hydroxy- or aminosulphonic acids. It is also possible to use non-ionic detergents, e.g. polyglycol ethers which are derived from ethylene oxide and higher fatty alcohols, alkylphenols or fatty amines;

(e) in combination with polymeric carrier materials (polymerisation, polycondensation or polyaddition products) in which the brightening agents may be incorporated in dissolved or dispersed form besides other substances, e.g. in the case of coating, impregnating or binding agents (solutions, dispersions, emulsions) for textiles, fleeces, paper, leather.

EXAMPLES OF PREPARATION (A) Reaction of (III) with (IV)

7 g. (0.025 mol) 5-methyl-2-p-carboxystyryl-benzotriazole are heated with 70 ml. thionyl chloride and 5 drops of dimethyl formamide under reflux for 90 minutes. The excess of thionyl chloride is distilled off, the dry residue is taken up with 75 ml. of anhydrous pyridine and stirred with 4.8 g. (0.025 mol) p-tert.-butyl-benzhydrazide at 50–30° C. for 2 hours. The mixture is turned out into water and the bis-hydrazide is filtered off with suction and dried. 12 g. of the bis-hydrazide are heated to boiling temperature in 150 ml. o-dichlorobenzene, and 15 ml. thionyl chloride are added in the course of 15 minutes. The suspension is further stirred for 10 minutes, a clear yellow solution being formed. The excess thionyl chloride is distilled off and the reaction product is filtered off with suction after cooling. After recrystallising twice from dimethyl formamide, there are obtained 4 g. of pale yellow needles of melting point 236–238° C.

The following compounds are obtained in an analogous way:

TABLE 2

R—[benzotriazole]—NCH=CH—[phenyl]—[oxadiazole]—R'

| No. | R | R' | M.P., °C. | λ, mµ | ε (in DMF) |
|---|---|---|---|---|---|
| 2 | H | $C_6H_5$ | 254–5 | 361 | 56,000 |
| 3 | H | p-$CH_3$—$C_6H_4$— | 259–61 | 361 | 59,000 |
| 4 | H | p-$CH_3O$—$C_6H_4$— | 262–4 | 363 | 68,000 |
| 5 | H | p-t-$C_4H_9$—$C_6H_4$— | 230–2 | 361 | 60,600 |
| 6 | H | p-$C_6H_5$—$C_6H_4$— | 279–81 | 363 | 61,500 |
| 7 | H | $CH_3$—[benzoxazole]— | 303–5 | 364 | 63,300 |
| 8 | $CH_3$ | p-$CH_3$—$C_6H_4$— | 238–40 | 365 | 60,500 |
| 9 | $CH_3$ | p-$C_6H_5$—$C_6H_4$— | 248–50 | 366 | 65,100 |
| 10 | $CH_3$ | $C_6H_5$ | 247–9 | 364 | 59,200 |
| 11 | $C_6H_5$ | $C_6H_5$ | 213–5 | 372 | 63,900 |
| 12 | $C_6H_5$ | p-$CH_3C_6H_4$— | 258–60 | 373 | 62,900 |
| 13 | $C_6H_5$ | p-$CH_3O$—$C_6H_4$— | 233–5 | 375 | 65,300 |
| 14 | $C_6H_5$ | p-t-$C_4H_9$—$C_6H_4$— | 236–8 | 365 | 61,100 |
| 15 | $C_6H_5$ | $CH_3$—[benzoxazole]— | 230–32 | | |

The 2-(p-carboxystyryl)-benzotriazoles used as starting materials are prepared as follows:

17.7 g. (0.1 mol) benzotriazolyl-2-acetic acid [prepared according to A 515, 113 (1935)] are heated with 16.5 g. (0.11 mol) p-carboxy-benzaldehyde and 8.5 g. (0.1 m.) pyridine in 250 ml. dimethyl formamide at boiling temperature under nitrogen for 4 hours. After cooling, the yellow reaction product is filtered off with suction and recrystallised from glycol monomethyl ether acetate. Yield of pure 2-(p-carboxystyryl)-benzotriazole: 17.5 g., M.P. 346–347° C.

In an analogous manner there are prepared:
2-(p-carboxystyryl) 5-phenyl-benzotriazole (M.P. 290–298° C.) from 5-phenyl-benzotriazolyl-2-acetic acid (M.P. 240° C.); and 2-(p-carboxystyryl)-5-methyl-benzotriazole (M.P. 312–323° C.) form 5-methyl-benzotriazolyl-2-acetic acid (M.P.: 192° C.).

(B) Reaction of (V) with (VI)

7 g. (0.025 mol) 5-methyl-2-(p-carboxystyryl)-benzotriazole are dissolved in 70 ml. of dry dioxan and heated with 30 ml. thionyl chloride and some drops of dimethyl formamide under reflux for 90 minutes. The excess of thionyl chloride is distilled off in a vacuum. When the remaining solution has cooled down, 0.8 g. of anhydrous hydrazine in 10 ml. dioxan are added dropwise while stirring. The solution of the hydrazide is heated to 45–50° C. and then mixed dropwise with a solution of 5 g. p-tert.-butyl-benzoyl chloride in 50 ml. dioxan, and stirring is continued for 30 minutes. 15 ml. thionyl chloride are then added in the course of 10 minutes, and the mixture is heated at boiling temperature for a further 10 minutes. The excess of thionyl chloride is distilled off; the oxdiazole crystallises upon cooling; it has a melting point of 237–238° C. The yield amounts to 8.5 g.

EXAMPLES OF APPLICATION

Example 1

A fabric of poly-ε-caprolactam is moderately moved about in a liquor ratio of 1:40 for 30 minutes in a bath at 80–90° C. which contains, per litre, 0.2 g. 2-[p-5'-p-tert. - butyl - phenyl - oxdiazolyl-(2')-styryl]-5-methyl-benzotriazole. After rinsing and drying, the fabric is excellently brightened. The brightening effects are stable to alkaline sodium hypochlorite solutions.

Example 2

A fabric of polyethylene glycol terephthalate fibres is treated in a liquor ratio of 1:40 in a bath containing, per litre, 1 g. oleyl alcohol sulphonate, 0.75 g. formic acid and 0.05 g. of the brightening agent 2, Table 2, or 0.05 g. of the brightening agent 4, Table 2. The bath is subsequently heated to boiling temperature and kept at this temperature for 30–50 minutes. After rinsing and drying, the polyester fibers exhibit an excellent brightening effect. Similar good brightening effects are obtained on threads of polyvinyl chloride.

Example 3

Polypropylene fibers which have a yellowish appearance are introduced in a liquor ratio of 1:40 into an aqueous bath containing, per litre, 0.075 g. of the brightening agent 8, 10 or 11, Table 2, and 0.5 g. of a commercial alkyl-naphthalene-sulphonate. The bath is heated at 100° C. for 45 minutes. After drying, the polypropylene fibres have a pure white appearance. The brightening effect has good fastness to light and chlorite.

Example 4

A fabric of fibres of aromatic polyesters is padded with an aqueous liquor containing, per litre, 1 g. of a commercial dispersing or wetting agent, 4 g. of an alginate thickening agent, and 1 g. of the brightening agent 2, 4, 5 or 7, Table 2. The fabric is then squeezed to a weight increase of 100%, dried and heated at 220° C. for 30 seconds. The fabric thus treated is subsequently washed hot and exhibits a clear brightening effect, compared with untreated material.

Example 5

A spinning solution prepared in the usual way from 1 kg. celluloseacetate in 4 litres acetone is mixed with a solution of 1.5 g. of the brightening agent 1 or 2, Table 2, in acetone, and spun in known manner. The threads so obtained exhibit a good brightening effect which is fast to light.

Example 6

65 g. polyvinyl chloride with a K-value of 72–74, 35 g. dioctyl phthalate, 2 g. of a commercial tin-containing organic stabiliser, 1 g. titanium dioxide (rutile) and 0.1 g. of the brightening agent 2, 4, 5 or 7, Table 2, are rolled on a hot roll of low friction at 165–170° C. for 5 minutes; the rough sheet so obtained is then drawn on a four-roll calender to produce a foil of 300μ. The foil exhibits a very clear brightening effect.

Example 7

1 g. of the brightening agent 2, Table 2, is dissolved in 1000 g. of a colourless lacquer of nitrocellulose or cellulose acetate. The lacquer is then thinly spread on a colourless substrate. After drying, the lacquer layer is excellently brightened.

Example 8

A mixture of 100 g. of a polyester granulate of terephthalic acid-ethylene glycol polyester and 0.5 g. of the brightening agent 2, 4 or 5, Table 2, is heated at 300° C. for 30 minutes and extruded in the usual way to produce filaments. The material so obtained exhibits an excellent brightening effect.

Example 9

A mixture of 100 g. polypropylene and 0.5 g. of the brightening agent 8, 10 or 11, Table 2, is heated to 280–290° C. and the melt is extruded according to known processes to produce filaments which exhibit a very good brightening effect.

We claim:

1. 2 - [4' - (oxdiazolyl-2")-styryl]-benzotriazole of the formula

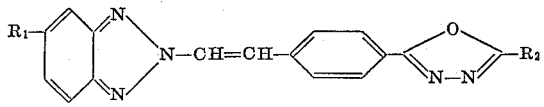

in which
R₁ is hydrogen, alkyl of 1–4 carbon atoms or phenyl; and
R₂ is hydrogen; phenyl; phenyl substituted with alkyl of 1–6 carbon atoms, chlorine, alkoxy of 1–4 carbon atoms, phenyl or cyclohexyl; β-styryl; benzoxazol-2-yl or benzoxazol-2-yl substituted with methyl.

2. 2 - [4' - (oxdiazolyl-2")-styryl]-benzotriazole of the general formula

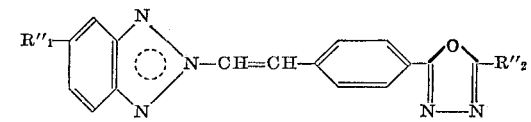

in which
R"₁ is hydrogen, a C₁–C₄ alkyl radical or a phenyl radical; and
R"₂ is a phenyl radical which may be substituted by C₁–C₄ alkyl or C₁–C₄ alkoxy.

3. Styryl compound of the formula

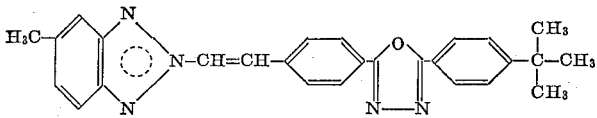

4. Styryl compound of the formula

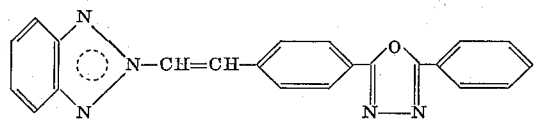

5. Styryl compound of the formula

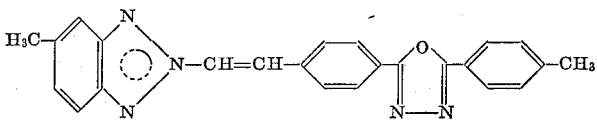

6. Styryl compound of the formula

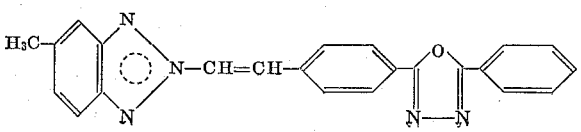

7. Styryl compound of the formula
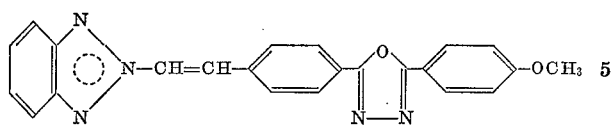
References Cited
UNITED STATES PATENTS
3,505,318 4/1970 Schellhammer et al. 260—240 D
3,609,160 9/1971 Meyer et al. 260—308 B
3,635,960 1/1972 Di Giovanoel et al. 260—240 D
FOREIGN PATENTS
1,573,623 5/1969 France 260—240 D
JOHN D. RANDOLPH, Primary Examiner
U.S. Cl. X.R.
8—65; 106—137, 148, 168, 170; 117—33.5 T; 162—162; 252—301.2 W, 543; 260—2 EP, 2 S, 37 P, 41 B, 47 R, 67.5, 75 N, 75 R, 77.5 D, 78 R, 92.8, 93.7